US006662531B1

United States Patent
Schwab et al.

(10) Patent No.: US 6,662,531 B1
(45) Date of Patent: Dec. 16, 2003

(54) METHOD AND AN INSTALLATION FOR THERMOFORMING, FILLING, AND CLOSING RE-ENTRANT RECEPTACLES

(75) Inventors: Dominique Schwab, Versailles (FR); Bernard Gandon, Saint-Arnoult en Yuelines (FR); Michel Luc, Chatenay Malabry (FR)

(73) Assignee: Erca Formseal, Les Ulis (FR)

( * ) Notice: Subject to any disclaimer, the term of this patent is extended or adjusted under 35 U.S.C. 154(b) by 0 days.

(21) Appl. No.: 10/193,873

(22) Filed: Jul. 12, 2002

(30) Foreign Application Priority Data

Jul. 11, 2001 (FR) ............................ 01 09196

(51) Int. Cl.[7] .............................................. B65B 47/00
(52) U.S. Cl. ......................... 53/453; 53/282; 53/307; 53/329.5; 53/559; 53/561; 53/389.3
(58) Field of Search ................. 53/282, 307, 329.5, 53/453, 559, 561, 140, 141, 389.3; 493/227, 223, 230, 231

(56) References Cited

U.S. PATENT DOCUMENTS

| 3,069,273 A | * | 12/1962 | Wayne | 53/412 |
|---|---|---|---|---|
| 3,685,251 A | * | 8/1972 | Mahaffy et al. | 53/559 |
| 3,783,581 A | * | 1/1974 | Pierce | 53/426 |
| 3,884,012 A | * | 5/1975 | Ernstsson et al. | 53/426 |
| 3,942,299 A | * | 3/1976 | Bory | 53/425 |
| 3,954,374 A | * | 5/1976 | Wommelsdorf et al. | 425/388 |
| 4,048,781 A | * | 9/1977 | Johansen | 53/453 |
| 4,565,513 A | * | 1/1986 | Kiefer | 425/289 |
| 4,625,498 A | * | 12/1986 | Parsons | 53/526 |
| 5,941,054 A | * | 8/1999 | Valyi | 53/453 |
| 6,073,422 A | * | 6/2000 | Massey et al. | 53/471 |
| 6,094,890 A | * | 8/2000 | Michellon et al. | 53/453 |

* cited by examiner

Primary Examiner—Stephen F. Gerrity
Assistant Examiner—Brian Nash
(74) Attorney, Agent, or Firm—James Ray & Associates

(57) ABSTRACT

The method and the installation of the invention enable re-entrant receptacles to be thermoformed, filled, and closed, the rim of each receptacle having a diameter that is smaller than the diameter of its body. Prior to thermoforming a row of receptacles, preliminary cuts separated by attachment points are made in a transverse stripe of the strip of the thermoplastic strip that is to be used for thermoforming in a subsequent cycle, and for each receptacle that is to be thermoformed, the cuts define practically the entire final periphery of the rim of said receptacle, the attachment points being broken when the receptacles are separated in a subsequent cycle after the filled receptacles have been closed.

16 Claims, 4 Drawing Sheets

METHOD AND AN INSTALLATION FOR THERMOFORMING, FILLING, AND CLOSING RE-ENTRANT RECEPTACLES

FIELD OF THE INVENTION

The invention relates to a method of making, filling, and closing re-entrant receptacles having rims of diameter smaller than the diameter of the bodies of said receptacles, in which method a strip of thermoplastic material is caused to advance stepwise, and between two successive advances of said strip, a transverse row of receptacles is made by thermoforming said strip, a row of receptacles made in a preceding cycle is filled, the filled receptacles of another row are closed with a covering, and the receptacles that were closed in an earlier cycle are separated from the strip of thermoplastic material.

The invention also relates to an installation for making, filling, and closing re-entrant receptacles presenting rims of diameter smaller than the diameter of the bodies of said receptacles, the installation comprising means for causing a strip of thermoplastic material to advance stepwise, and comprising from upstream to downstream in the stepwise advance direction of said strip: a thermoforming station suitable for thermoforming a transverse row of receptacles in said strip; a filling station for filling a row of receptacles; a closing station for closing a row of filled receptacles with a covering; and a separator station for separating a row of closed receptacles from the strip of thermo-plastic material.

BACKGROUND OF THE INVENTION

When thermoforming receptacles that are not re-entrant in a strip of thermoplastic material, a covering strip is applied to the filled receptacles, the strip is sealed onto the rims of the receptacles, and the covering strip and the strip of thermo-plastic material are cut together in a separator station having an upper cutting tool and a lower backing tool, the tool and the backing tool being movable vertically to move towards each other during a processing cycle to separate filled receptacles that have been closed by means of a covering. When the receptacles are for presenting in groups of at least two receptacles interconnected by a connection line, care is taken to perform the cutting so as to preserve the connection line, in which case only the covering strip is cut through on the path corresponding to the connection line. The cutting tool comprises a blade which co-operates with an anvil blade in order to cut simultaneously through both strips over their entire thickness outside the connection lines, and in the connection lines to cut through only the covering strip while merely biting into only a fraction of the thickness of the strip of thermoplastic material. The cutting tool and the backing tool then need to be positioned with accuracy of 5 micrometers ($\mu$m) in the plane of the strip of thermoplastic material.

When the receptacles are re-entrant, with the diameter of the rim of each receptacle being smaller than the diameter of the body of the receptacle, the lower backing tool must be made in the form of at least two separable elements that need to be moved both vertically and radially towards the axis of the receptacle prior to performing cutting proper by lowering the cutting tool. That disposition requires complex moving parts and it is difficult to obtain the required accuracy of 5 $\mu$m. It also requires sufficient clearance to be left between the bodies of the receptacles to leave room to pass the separable elements of the backing tool, as they move up and down.

A difficulty of the same kind arises in the station for thermoforming re-entrant receptacles. Thermoforming molds are made as two separable portions. Nevertheless, when the molds are assembled together there are no obstacles, and the problem of separation occurs only for unmolding. In addition, the shape of the molding pistons does not require the molds and the pistons to be positioned relative to one another during thermoforming with precision of 5 $\mu$m.

OBJECTS AND SUMMARY OF THE INVENTION

An object of the invention is to provide a method and an installation of the kinds mentioned in the introduction, making it possible simply and at low cost to separate filled and closed receptacles from the strip of thermoplastic material.

In the method of the invention, this object is achieved by the fact that prior to thermoforming a row of receptacles, preliminary cuts separated by attachment points are formed in a transverse stripe of the strip of thermoplastic material used for thermoforming a row of receptacles in a subsequent cycle, said preliminary cuts defining practically the entire final periphery of the rim of each receptacle that is to be thermoformed, the attachment points being broken when the receptacles are separated in a subsequent cycle after the filled receptacles have been closed.

Thus, a large fraction of the cutting of the periphery of each receptacle is implemented on a plane portion of the strip of thermoplastic material.

Advantageously, the attachment points are broken by pressing moving pistons against the rims of the receptacles, said pistons co-operating in particular with stationary backing tools placed between the receptacles in a row.

In order to ensure that the strip of thermoplastic material is sterile, the preliminary cuts are made by melting the material of the thermoplastic strip.

In order to limit losses of plastics material between two transverse rows of receptacles, prior to thermoforming, a scrap zone of the strip of thermoplastic material extending between two consecutive transverse stripes is subjected to stretching.

Most advantageously, prior to closing the filled receptacles, a row of coverings are cut out in a covering strip that advances stepwise. The coverings are cut out around an outline adapted at least in part to the final outline of the rims of the receptacles. Each covering can present a pull tab located on the outside beyond a discontinuous line of cut in the corresponding filled receptacle. During a treatment cycle, a row of coverings are cut out, they are brought over a row of filled receptacles, they are steadied on the rims of the receptacles by spot connections, and they are sealed to the rims of the receptacles in a subsequent cycle.

To reduce wastage from the covering strip, a row of coverings cut out from a covering strip of width that is smaller than the width of the strip of thermoplastic material. Preferably, the size of the advance step of the covering strip is smaller than the size of the advance step of the thermoplastic material.

The installation of the invention includes, upstream from the thermoforming station, a preliminary cutting station suitable for making preliminary cuts separated by attachment points in a transverse stripe of said strip of thermoplastic material used for thermoforming a row of receptacles in a subsequent cycle, the preliminary cuts defining practically the entire final periphery of the rim of each receptacle that is to be thermoformed, and the separator station has means for breaking said attachment points in a subsequent cycle.

Preferably, the means for breaking the attachment points of a row of filled and closed receptacles comprise vertically movable pistons bearing against the rims of said receptacles and cooperating in particular with stationary backing tools placed between the receptacles of said row.

Advantageously, the preliminary cutting station has tools for hot cutting.

The installation further comprises, upstream from the thermoforming station, stretching means for stretching a scrap zone of the strip of thermoplastic material, the scrap zone extending between two consecutive transverse stripes.

It also comprises means for advancing a covering strip stepwise, means for cutting out a row of coverings, means for bringing them over a row of filled receptacles, means for causing the covering to be held in position on the rims of the corresponding receptacles during one cycle, and means for sealing the covering on the rims during a subsequent cycle.

BRIEF DESCRIPTION OF THE DRAWINGS

Other advantages and characteristics of the invention appear on reading the following description of a preferred embodiment of the invention, given by way of non-limiting example and described with reference to the accompanying drawings, in which.

MORE DETAILED DESCRIPTION

Figure 1:
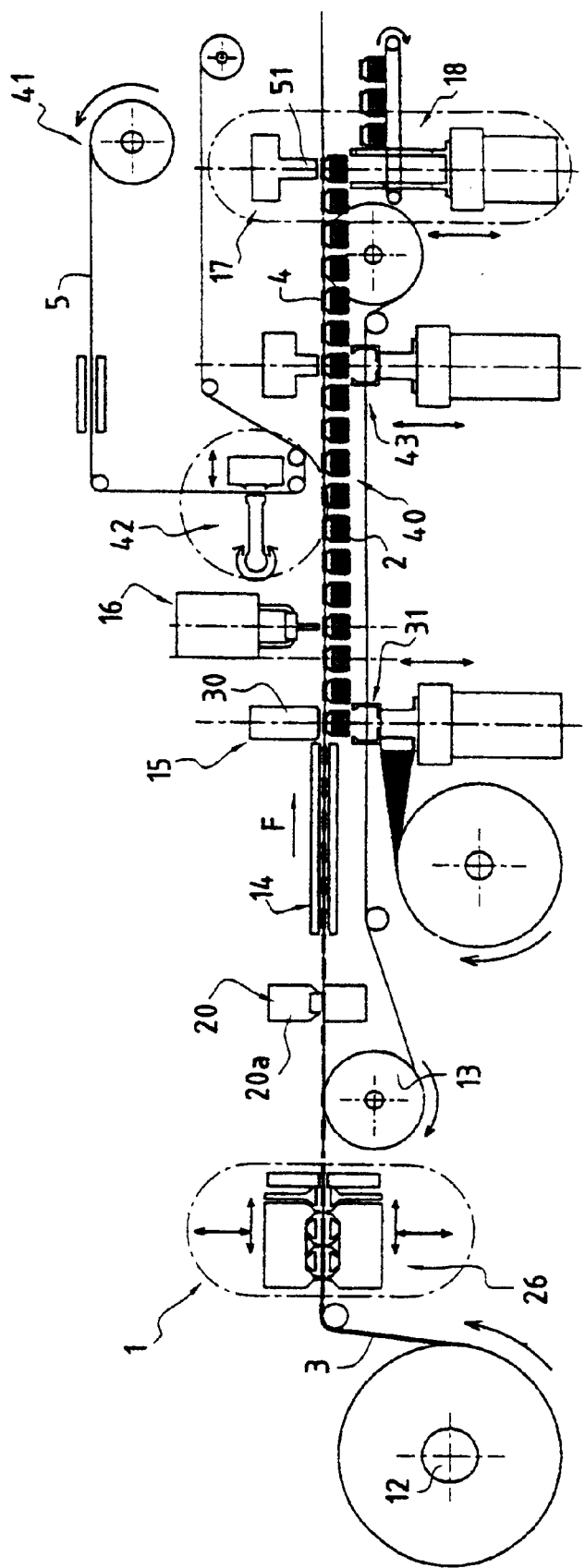
FIG. 1 is a diagrammatic general view of an installation in accordance with the invention and enabling the method of the invention to be implemented.

FIG. 1 shows an installation 1: for thermoforming receptacles 2 from a strip 3 of thermoplastic material; for filling the receptacles with a product that may be in liquid, semiliquid, or gelled form, in particular a food; for closing the filled receptacles with a covering 4 taken from a covering strip 5; and for cutting the filled and closed receptacles 2 from the strip of thermoplastic material.

Figure 2:
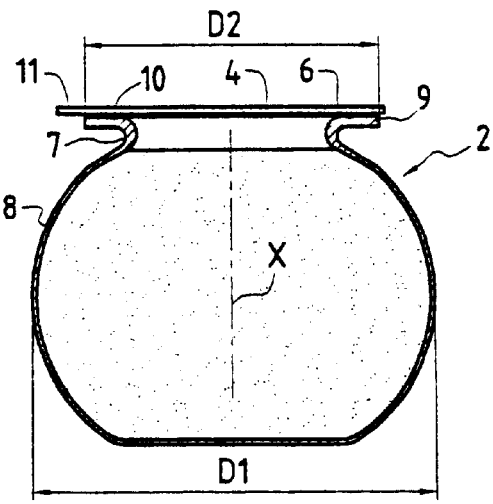
FIG. 2 is a section view on a plane of symmetry of a filled and closed receptacle.
Figure 3:
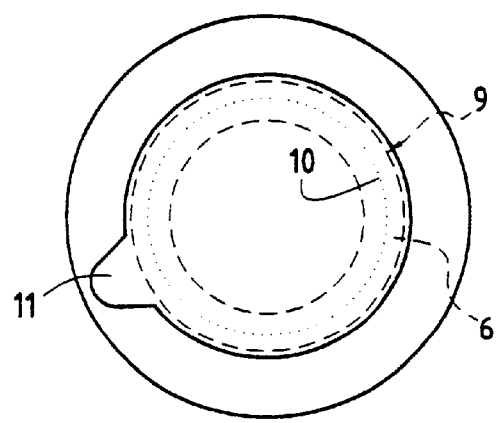
FIG. 3 is a plan view of the FIG. 2 receptacle.

As shown in detail in FIGS. 2 and 3, the receptacles 2 that are provided are re-entrant receptacles each having a rim 6 in the horizontal plane of the travel path of the thermoplastic strip 6 connected via a neck 7 to a receptacle body 8 having a diameter $D_1$ greater than the diameter $D_2$ of the outline 9 of the rim 6 of the receptacle 2.

Each filled and closed receptacle 2 carries a covering 4 fixed by a closed bead of heat sealing 10 to the rim 6. This covering has a diameter that is not less than the diameter $D_2$ of the outline 9 of the receptacle 2 and it may present a pull tab 11 for making the receptacle 2 easier to open, said tab projecting radially outwards beyond a zone 9a of the outline 9, as shown in FIGS. 2 and 3. The receptacles 2 may be circularly symmetrical about a vertical axis X, or they may equally well have a horizontal section that is not circular.

The installation 1 has a reel 12 from which the thermoplastic strip 3 is unreeled, which strip passes horizontally throughout the entire installation, being driven stepwise by support and drive means such as a conveyor 13. As the thermoplastic strip 3 travels in the direction of arrow F, going from upstream to downstream, it passes through various successive stations of the installation.

Thus, in the direction of arrow F, the installation comprises in succession: a heater box 14 which is used for raising the thermoplastic strip 3 to thermoforming temperature; a thermoforming station 15 in which the receptacles 2 are thermoformed and optionally fitted with banderoles; a measuring-out and filling station 16 which fills the receptacles 2 made in a preceding cycle; a station 40 for applying a covering to close the receptacles 2 filled in a prior cycle; a station 17 for separating receptacles closed in a preceding cycle; and an exit station 18 for delivering receptacles that have been individually cut apart. During each processing cycle between two consecutive advances of the thermoplastic strip 3: a transverse row of receptacles 2 is made; a second transverse row of receptacles 2 is filled; a third transverse row of receptacles is closed; and a fourth row of receptacles is separated from the thermoplastic strip; these various rows being located from upstream to downstream in the above-described stations.

Figure 4:
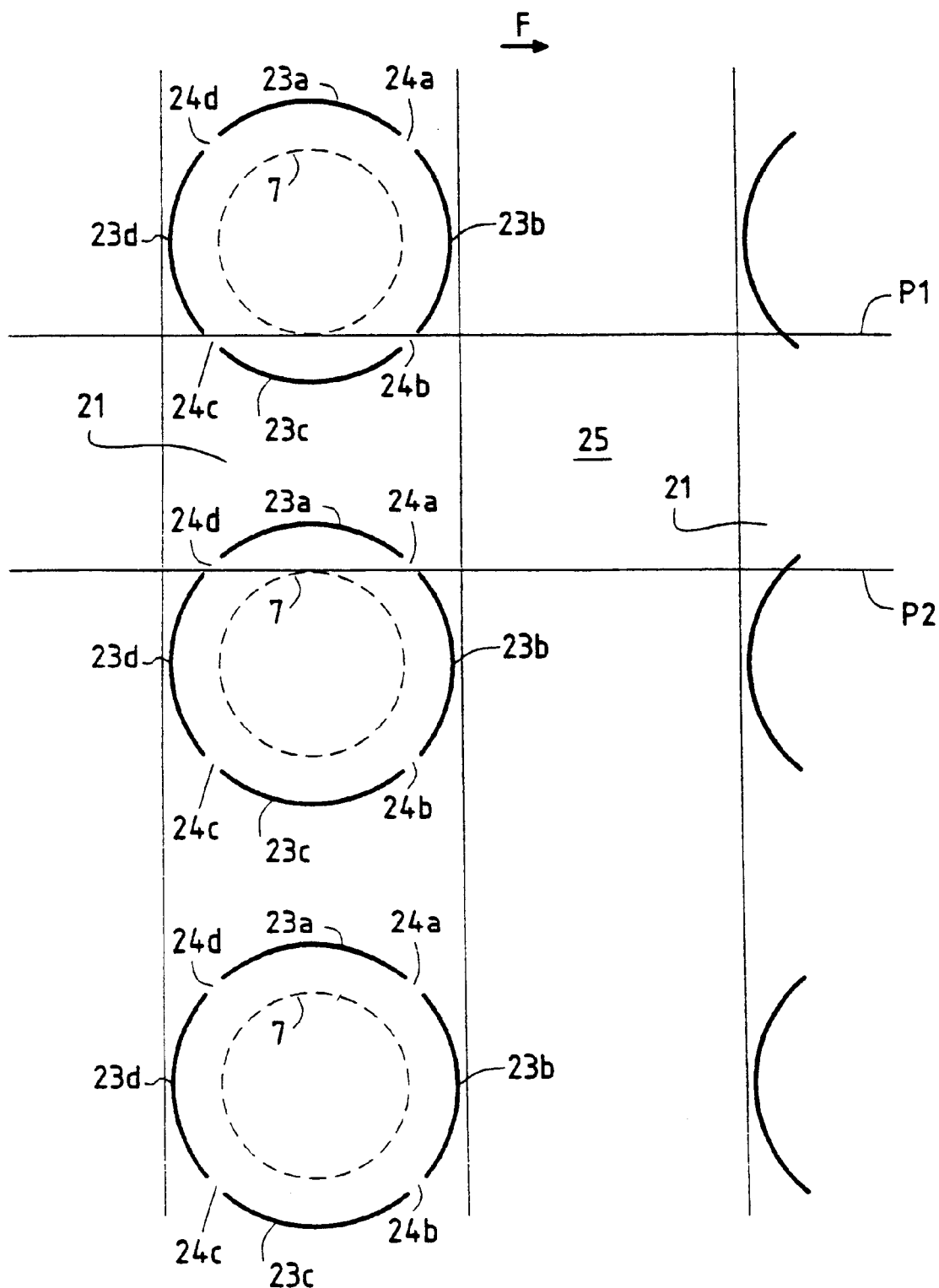
FIG. 4 is a fragmentary view of the thermoplastic strip after passing through the preliminary cutting station and prior to thermoforming.

Upstream from the heater box 14, the installation 1 has a preliminary cutting station 20 which forms a plurality of preliminary cuts 23a, 23b, 23c, 23d separated by attachment points 24a, 24b, 24c, 24d in a stripe 21 of the thermoplastic strip 3. Said transverse stripe is thermoformed in a subsequent cycle to form a row of receptacles 2. The preliminary cuts occupy those zones of the stripe that correspond to the peripheries 9 of the rims 6 of the receptacles that are subsequently thermoformed. Prior to thermoforming, these cuts define nearly all of the final periphery of the corresponding receptacle. The attachment points 24a and 24b act as bridges connecting the disk that is used for thermoforming a receptacle to the scrap portion of the strip. These four attachment points 24a per receptacle in the example shown in FIG. 4 could be provided in larger numbers. They are broken subsequently by being sheared in the separation station 17.

The preliminary cuts 23a to 23d occupy an angular extent about the axis X of the corresponding receptacle that is much greater than the angular extent occupied by the attachment points 24a to 24d.

The preliminary cutting station 20 has an upper cutting tool 20a which is vertically movable and which co-operates with a lower backing tool. The cutting tool comprises a plurality of blades having the configuration of the cutouts 23a to 23d. Cutting is preferably performed by melting the thermoplastic material so as to ensure that the strip 3 continues to be sterile.

Because the receptacles 2 are re-entrant, and because the diameter $D_2$ of the rims 6 of the receptacles 2 is smaller than the diameter $D_1$ of the bodies 8 of the receptacles, two consecutive stripes 21 are spaced apart by a transverse zone of scrap 25 that is of non-negligible width and that will form part of the strip of scrap on exiting the cutting station.

To reduce wastage of thermoplastic material, the installation has a stretching station 26 for stretching the thermoplastic strip 3 upstream from the heater box 14, and preferably upstream from the preliminary cutting station 20, the stretching station serving to reduce the wall thickness of the strip in its scrap zone 25.

The stretching station 26 comprises pairs of clamps for holding adjacent stripes 21, means for heating the zone to be stretched between two adjacent stripes 21, means for moving the pairs of clamps apart, and means for cooling the zone of scrap 25 that was stretched during a preceding cycle.

The thermoforming station 15 comprises a row of pistons 30 placed above the path of the thermoplastic strip 3 and arranged to be vertically movable, together with a row of molds 31 each comprising two separable portions, the molds being placed beneath the path of the thermoplastic strip 3 and being vertically movable in the direction of arrow F, at least for the downstream portions of the molds, in order to enable the receptacles 2 which are reentrant to be unmolded.

The station 40 for closing filled receptacles 2 has: means 41 for driving the strip 5 of covering stepwise synchronously with the thermoplastic strip 3; means 42 for cutting out a row of coverings, positioning them on the filled receptacles 2 in a row of receptacles, and sticking them via spots to the rims 6 of the receptacles; and a separate assembly 43 for implementing beads of heat sealing 10 on said receptacles 2 during a subsequent treatment cycle.

Thereafter, all that remains to be done is to break the remaining attachment points 24a to 24d at the peripheries 9 of a row of receptacles 2 in the separator station 17.

Figure 5:
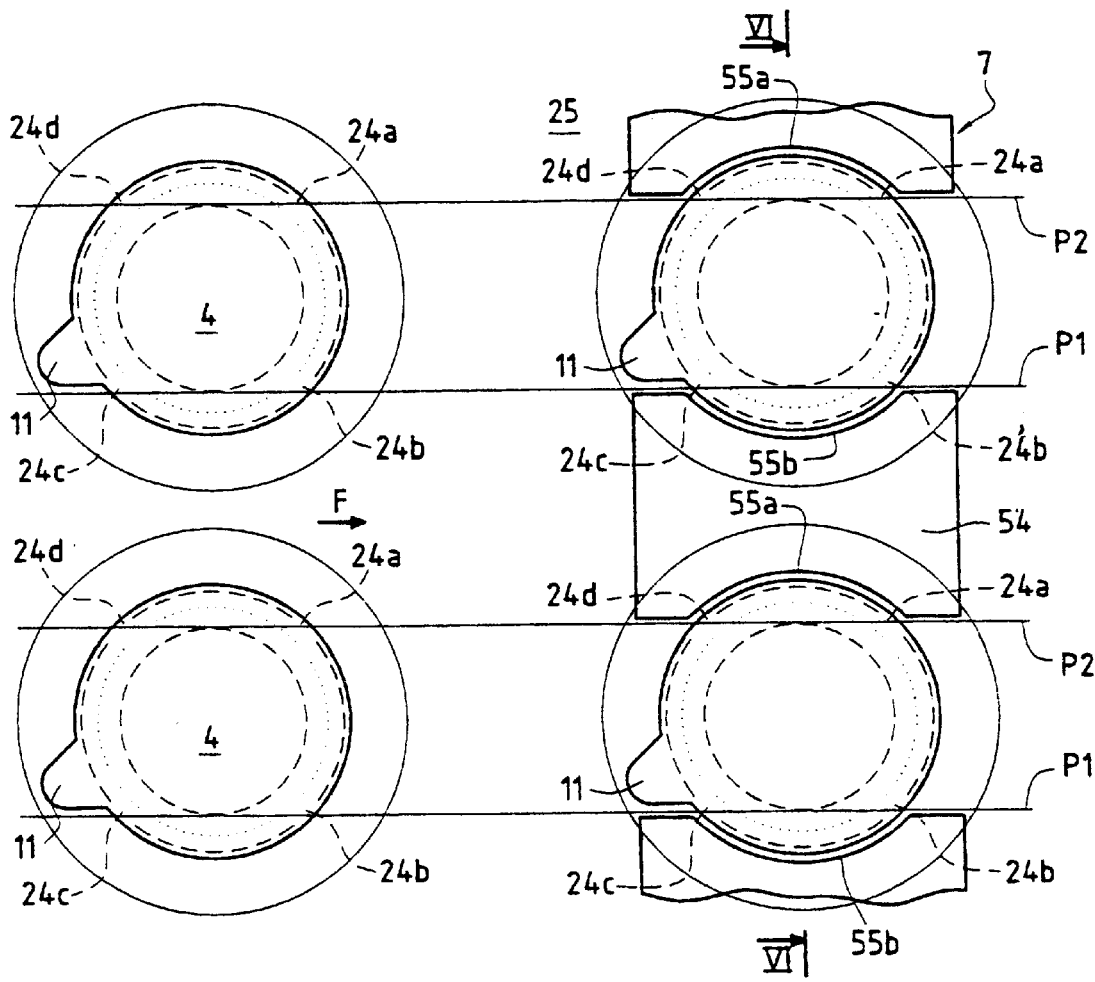
FIG. 5 is a plan view of a row of receptacles in the final separation station and of the row of receptacles situated upstream therefrom.

In this station, the stripe 21 presents a row of coverings 4 on its top face, said coverings being sealed to the rims 6 of the filled receptacles, and also the preliminary cutouts 23a to 23d placed inside and immediately adjacent to the peripheries of the covering 4, as can be seen in FIG. 5. The tongues 11 of the covering 4 cover part of one of these preliminary cuts.

Figure 6:
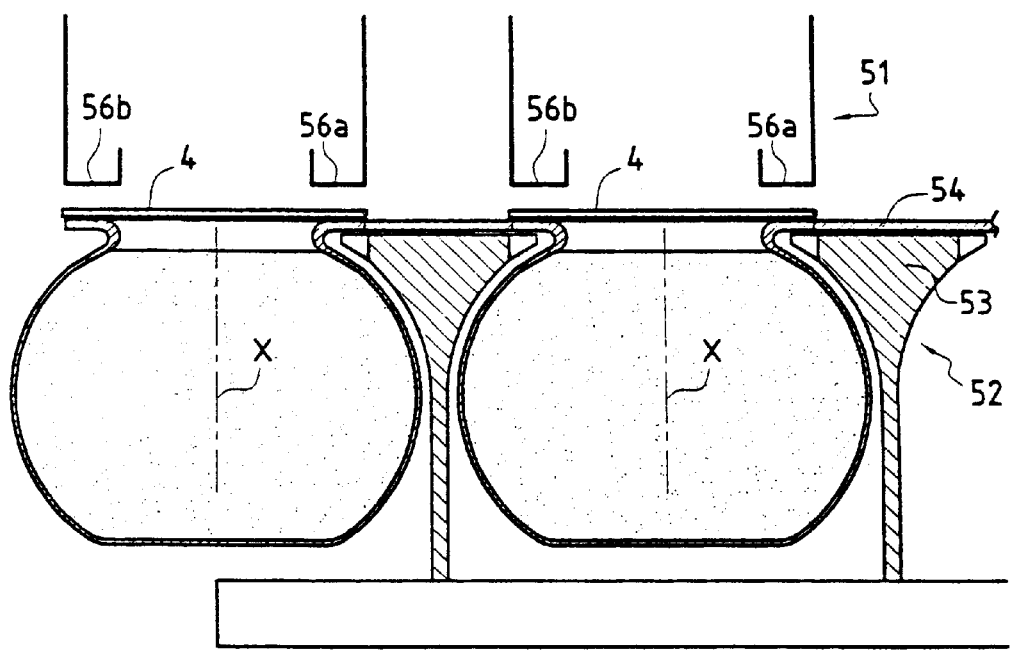
FIG. 6 is a vertical section on line VI—VI of FIG. 5.

In conventional manner, the separator station 17 has vertically movable pistons 51 placed about the thermoplastic strip 3 and a backing tool 52 placed beneath it. Most advantageously, a portion of the backing tool 52 visible in FIG. 6 is stationary and comprises an anvil 53 between two adjacent receptacles 2, and also adjacent to the outer side faces of the end receptacles of the row, the top face 54 of each anvil 53, as shown in FIG. 5, presents lateral indentations 55a, 55b of outline shaped to match the outline of the peripheries 9 of the adjacent receptacles, and designed to co-operate with the bottom faces 56a and 56b of the pistons 51 pressed against the rims 6 of the filled and closed receptacles. The anvils 53 have a vertical cross section of a shape such that the filled receptacles which take up position in the separator station 17 as the thermoplastic strip 3 advances do not come into abutment against the anvils 53. Most advantageously, the stationary portion of the backing tool 51 also presents an anvil that is stationary on the downstream side of the row of receptacles situated in the separator station 17. In contrast, a vertically movable backing tool is brought into position on the upstream side. To break the attachment points 24a to 24d, the pistons 51 are moved vertically through the thermoplastic strip 3, the strip of scrap then resting on the backing tools 51 in the vicinity of the peripheries 9. The attachment points are broken by traction and by shear.

Because the receptacles 2 made by the above-described installation are re-entrant, and because the rims 6 of the receptacles 2 are of a diameter $D_2$ that is smaller than the diameter of the bodies 8 of said receptacles, the size of the advance step of the thermoplastic strip 3 is considerably greater than the diameter $D_1$ of the bodies 8 of the receptacles 2 so as to make it possible to perform unmolding in the thermoforming station 15. Savings in the thermoplastic material wasted in the strip of scrap are achieved by stretching the strip of scrap 25 in the stretching station 26.

Conventionally, the filled receptacles are closed by applying a strip onto the strip of thermoplastic material after the receptacles 2 have been filled and then, once the coverings have been sealed, the covering strip is cut through simultaneously with the thermoplastic strip in the cutting station. In the present invention, the coverings 4 are cut from the covering strip advancing stepwise prior to being sealed onto the rims 6 of the receptacles. The size of the advance step of the covering strip 5 is most advantageously smaller than the size of the advance step of the thermoplastic strip 3 so as to avoid excessive wastage from the covering strip 5. In addition, because the rims 6 of two consecutive receptacles in a row of receptacles are spaced apart by the minimum spacing of the indentations 55a and 55b of an anvil, a strip 5 is used that is of a width which is smaller than the width of the thermoplastic strip 3 so as to further reduce losses from the covering strip 5.

We claim:

1. A method of making, filling, and closing re-entrant receptacles having rims of diameter smaller than the diameter of the bodies of said receptacles, in which method a strip of thermoplastic material is caused to advance stepwise, and between two successive advances of said strip, a transverse row of receptacles is made by thermoforming said strip, a row of receptacles made in a preceding cycle is filled, the filled receptacles of another row ate closed with a covering, and the receptacles that were closed in an earlier cycle are separated from the strip of thermoplastic material, wherein, prior to thermoforming a row of receptacles, preliminary cuts separated by attachment points are formed in a transverse stripe of the strip of thermoplastic material used for thermoforming a row of receptacles in a subsequent cycle, said preliminary cuts defining practically the entire final periphery of the rim of each receptacle that is to be thermoformed, the attachment points being broken when the receptacles are separated in a subsequent cycle after the filled receptacles have been closed.

2. A method according to claim 1, wherein the attachment points are broken by pressing moving pistons against the rims of the receptacles, said pistons co-operating in particular with stationary backing tools placed between the receptacles in a row.

3. A method according to claim 1, wherein the preliminary cuts are made by melting the material of the thermoplastic strip.

4. A method according to claim 1, wherein, prior to thermoforming, a scrap zone of the strip of thermoplastic material extending between two consecutive transverse stripes is subjected to stretching.

5. A method according to claim 1, wherein, prior to closing the filled receptacles, a row of coverings are cut out in a covering strip that advances stepwise.

6. A method according to claim 5, wherein coverings are cut out so as to have an outline that matches at least in part the final outline of the rims of the receptacles.

7. A method according to claim 6, wherein the coverings are cut out in such a manner that each of them presents a pull tab that is located on the outside beyond a discontinuous cut of the corresponding filled receptacle.

8. A method according to claim 5, wherein, during a cycle in which a row of coverings are cut out, they are brought over a row of filled receptacles, they are prevented from moving relative to the rims of the receptacles by being connected via points, and they are sealed to the rims of the receptacles in a subsequent cycle.

9. A method according to claim 5, wherein a row of coverings are cut out from a covering strip of width that is smaller than the width of the strip of thermoplastic material.

10. A method according to claim 9, wherein the size of the advance step of the covering strip is smaller than the size of the advance step of the thermoplastic material.

11. An installation for making, filling, and closing re-entrant receptacles presenting rims of diameter smaller than the diameter of the bodies of said receptacles, the installation comprising means for causing a strip of thermoplastic material to advance stepwise, and comprising from upstream to downstream in the stepwise advance direction of said strip: a thermoforming station suitable for thermoforming a transverse row of receptacles in said strip; a filling station for filling a row of receptacles; a closing station for closing a row of filled receptacles with a covering; and a separator station for separating a row of closed receptacles from the strip of thermoplastic material, the installation including, upstream from the thermoforming station, a preliminary cutting station suitable for making preliminary cuts separated by attachment points in a transverse stripe of said strip of thermoplastic material used for thermoforming a row of receptacles in a subsequent cycle, the preliminary cuts defining practically the entire final periphery of the rim of each receptacle that is to be thermoformed, and the separator station having means for breaking said attachment points in a subsequent cycle.

12. An installation according to claim 11, wherein the preliminary cutting station has tools for hot cutting.

13. An installation according to claim 11, wherein the means for breaking the attachment points of a row of filled and closed receptacles comprise vertically movable pistons bearing against the rims of said receptacles and co-operating in particular with stationary backing tools placed between the receptacles of said row.

14. An installation according to claim 11, further comprising, upstream from the thermoforming station, stretching means for stretching a scrap zone of the strip of thermoplastic material, the scrap zone extending between two consecutive transverse stripes.

15. An installation according to claim 14, wherein the stretching means are disposed upstream from the preliminary cutting station.

16. An installation according to claim 11, further comprising means for advancing a covering strip stepwise, means for cutting out a row of coverings, means for bringing them over a row of filled receptacles, means for causing the coverings to be held in position on the rims of the corresponding receptacles during one cycle, and means for sealing the covering on the rims during a subsequent cycle.

* * * * *